United States Patent
Fujii et al.

(10) Patent No.: US 10,466,627 B2
(45) Date of Patent: Nov. 5, 2019

(54) MEMBER FOR AN IMAGE FORMING APPRATUS

(71) Applicants: Hidetoshi Fujii, Shizuoka (JP); Akira Izutani, Shizuoka (JP); Ryoh Miyakoshi, Shizuoka (JP)

(72) Inventors: Hidetoshi Fujii, Shizuoka (JP); Akira Izutani, Shizuoka (JP); Ryoh Miyakoshi, Shizuoka (JP)

(73) Assignee: RICOH COMPANY, LTD., Tokyo (JP)

( * ) Notice: Subject to any disclaimer, the term of this patent is extended or adjusted under 35 U.S.C. 154(b) by 192 days.

(21) Appl. No.: 15/417,323

(22) Filed: Jan. 27, 2017

(65) Prior Publication Data

US 2017/0227892 A1 Aug. 10, 2017

(30) Foreign Application Priority Data

Feb. 10, 2016 (JP) .................. 2016-024052
Jun. 23, 2016 (JP) .................. 2016-124784

(51) Int. Cl.
*G03G 15/16* (2006.01)
*B32B 27/28* (2006.01)
*B32B 27/34* (2006.01)
*B32B 27/36* (2006.01)

(52) U.S. Cl.
CPC .......... *G03G 15/162* (2013.01); *B32B 27/285* (2013.01); *B32B 27/34* (2013.01); *B32B 27/36* (2013.01); *B32B 2433/00* (2013.01); *G03G 2215/00683* (2013.01); *Y10T 428/31725* (2015.04)

(58) Field of Classification Search
CPC ....... B32B 27/285; B32B 27/34; B32B 27/36; B32B 2433/00; G03G 15/16; G03G 2215/00683; Y10T 428/31725
See application file for complete search history.

(56) References Cited

U.S. PATENT DOCUMENTS

| | | | | |
|---|---|---|---|---|
| 6,737,133 B2* | 5/2004 | Kusaba | .................. | G03G 5/104 399/302 |
| 2002/0061378 A1* | 5/2002 | Kusaba | .................. | G03G 5/104 428/36.92 |
| 2006/0051140 A1* | 3/2006 | Shimomura | ....... | G03G 15/1685 399/303 |
| 2014/0079442 A1* | 3/2014 | Yamada | ............. | G03G 15/0818 399/286 |

FOREIGN PATENT DOCUMENTS

| JP | 2003-029538 A | 1/2003 |
|---|---|---|
| JP | 2006-133472 A | 5/2006 |
| JP | 2006-313308 A | 11/2006 |
| JP | 2007072240 A * | 3/2007 |
| JP | 2008-276026 A | 11/2008 |
| JP | 2011-180275 A | 9/2011 |

OTHER PUBLICATIONS

Sanyo Chemical Product Outline. Performance Chemicals for Synthetic Resin & Rubber Industries and Paint, Ink & Pigment. Industries. 8 pages. Mar. 25, 2016. (Year: 2016).*
Machine translation of JP 2007-072240. (Year: 2007).*
U.S. Appl. No. 14/967,827, filed Dec. 14, 2015.

* cited by examiner

*Primary Examiner* — John D Freeman

(74) *Attorney, Agent, or Firm* — Oblon, McClelland, Maier & Neustadt, L.L.P.

(57) ABSTRACT

Member for an image forming apparatus having an outer layer that includes polyethylene glycol and a polyether ester amide having therein a structural unit of polyethylene glycol.

17 Claims, 3 Drawing Sheets

MEMBER FOR AN IMAGE FORMING APPRATUS

CROSS-REFERENCE TO RELATED APPLICATIONS

This patent application is based on and claims priority pursuant to 35 U.S.C. § 119 to Japanese Patent Application No. 2016-024052, filed on Feb. 10, 2016 and Japanese Patent Application No. 2016-124784, filed on Jun. 23, 2016 in the Japan Patent Office, the entire disclosures of which are hereby incorporated by reference herein.

BACKGROUND

Technical Field

The present application relates to a member useful in an image forming apparatus.

Description of the Related Art

A member comprising of semiconducting resin composition, to be useful in an image forming apparatus, must suppress abnormal images and filming.

However, it is difficult to suppress filming and to control resistivity in a semiconducting range. Especially when a belt is molded by thermoplastic resin extrusion, the deviation of resistance in a circumferential direction of the belt becomes large. When a deviation of resistivity in a circumferential direction is large, first transfer or second transfer is poor at high surface resistivity areas and it results in abnormal images.

SUMMARY

Described is a member for an image forming apparatus that comprises an outer layer including a polyether ester amide comprising, as a structural unit therein, polyethylene glycol. In a preferred embodiment the outer layer includes the polyether ester amide in an amount of from 1% by weight to 15% by weight, based on the weight of the outer layer. In another preferred embodiment the outer layer further comprises monomeric polyethylene glycol in an amount of from 1 µmol/g to 25 µmol/g, based on the weight of the outer layer.

BRIEF DESCRIPTION OF THE DRAWINGS

Various other objects, features and attendant advantages of the present application will be more fully appreciated as the same becomes better understood from the detailed description when considered in connection with the accompanying drawings in which like reference characters designate like corresponding parts throughout and wherein.

DETAILED DESCRIPTION

Figure 1:
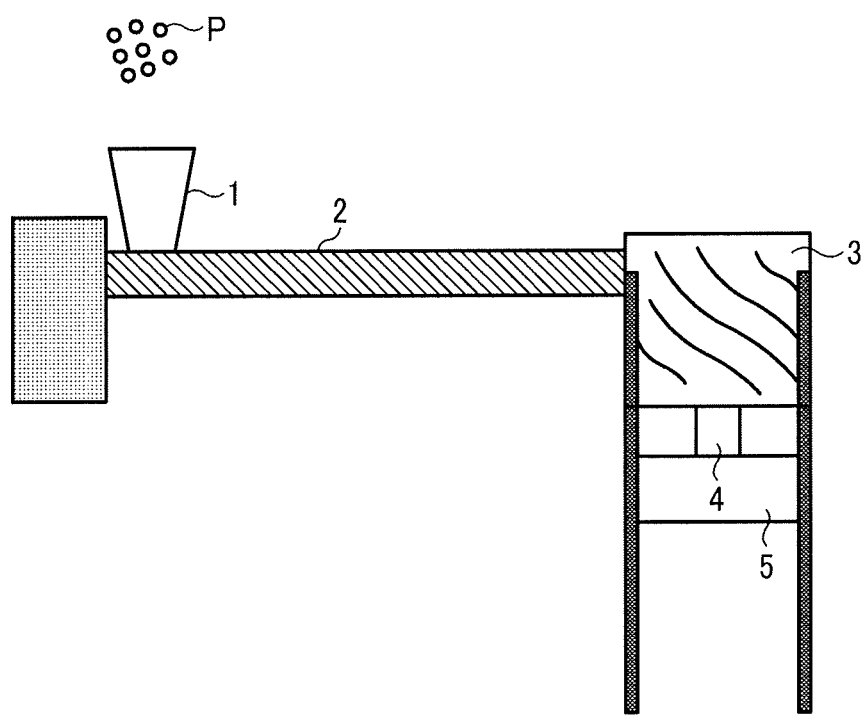
FIG. 1 is an extrusion apparatus.

An object of the present application is to provide a member for an image forming apparatus capable of inhibiting deviation of resistance and filming.

Member for an Image Forming Apparatus

A member for an image forming apparatus comprises an outer layer including a polyether ester amide. The polyether ester amide has structural units of polyethylene glycol therein (i.e., polyethylene glycol is a reactant in the preparation of the polyether ester amide).

A member for an image forming apparatus may have a single-layered structure or a multilayered structure.

As the result of inventors' study, in a member for an image forming apparatus that comprises an outer layer including a polyether ester amide which has structural units of polyethylene glycol, the inventors found that the amount of monomeric polyethylene glycol in the outer layer affects filming.

By controlling the amount of polyethylene glycol in the outer layer of a member for an image forming apparatus filming can be inhibited. The term filming here means the adherence of inorganic oxides coming from toners, for example $SiO_2$ and $TiO_2$, and matter coming from paper, for example calcium carbonate and talc.

A member for an image forming apparatus is used in xerography, for example applying the photoconductive effect of a semiconductor and a charging effect. Examples of such members include intermediate transfer rollers, intermediate transfer belts, second transfer belts, and paper conveyance belts.

The amount of polyethylene glycol (monomer) in the outer layer is preferably from 1 µmol/g to 25 µmol/g, including, e.g., 2, 4, 6, 8, 10, 12, 14, 16, 18, 20, 22 and 24 µmol/g, and all subranges and values therebetween, based on the total weight of the outer layer. The amount is preferably from 1 µmol/g to 8 µmol/g. Amounts less than 1 µmol/g and above 25 µmol/g are not preferred, as filming tends to occur. The amount of polyethylene glycol in the outer layer can be controlled, for example, by cleaning the outer layer with a cleaning liquid. The cleaning liquid is for example water and acetone. While not bound by any theory, it is believed that the polyethylene glycol monomer is often present in the outer layer as an impurity contained in the polyether ester amide comprising, as a structural unit therein, polyethylene glycol. If necessary or desired, polyethylene glycol monomer can be added to the outer layer composition to adjust the amount thereof.

The amount of polyether ester amide in the outer layer is in an amount of from 1% by weight to 15% by weight, including 3, 5, 7, 9, 11 and 13% by weight, based on the total weight of the outer layer. The amount is preferably from 3% by weight to 9% by weight. Amounts less than 1% by weight or above 15% by weight are not preferred as deviation of resistance in the surface of the member for an image forming apparatus increases.

The polyether ester amide is preferably a crystalline resin.

The melting point of the polyether ester amide is preferably from 200° C. to 230° C., and more preferably from 210° C. to 230° C. Melting points from 200° C. to 230° C. advance moldability in extrusion, and make deviation of resistance in the outer layer smaller.

The outer layer further preferably includes a thermoplastic resin that is not a polyether ester amide and conductivity filler.

Specific examples of thermoplastic resins include, but are not limited to, polyolefin resins such as polyethylene and polypropylene; and fluororesins such as polyvinylidene fluoride. Polystyrene, polymethylacrylate, polyvinyl chloride, polybutadiene, natural rubbers, polyvinyl alcohol, polyamide, etc. can also be used. Among these, polyvinylidene fluoride having incombustibility is preferably used.

The thermoplastic resin is preferably a crystalline resin.

It is preferred that the polyether ester amide and the thermoplastic resin satisfy the formula: $100 \geq Tc1 - Tc2 \geq 5$, wherein $Tc1$ [° C.] is the crystallization temperature of the polyether ester amide and Tc2[° C.] is the crystallization temperature of the thermoplastic resin. It is more preferable to satisfy the formula: 100≥Tc1−Tc2≥35. By satisfying formula Tc1−Tc2≥5, it achieves image durability at high-temperature and humid conditions. By satisfying formula 100 Tc1−Tc2, it achieves moldability in extrusion and makes the deviation of resistance in the outer layer smaller.

Specific examples of the conductivity fillers include, but are not limited to, metallic oxide and carbon black, etc. Among these, carbon black is preferably used.

Specific examples of the metallic oxide include, but are not limited to, zinc oxide, tin oxide, titanic oxide, zirconium oxide, aluminum oxide and silicon oxide etc. Besides, the metallic oxide prepared surface is used to advance dispersibility.

Specific examples of the carbon black include, but are not limited to, ketjen black, channel black, furnace black, acetylene black, thermal black, gas black, graphite and carbon nanotube etc. Among these, acetylene black is preferably used.

There are many kinds of carbon blacks which are different oxidatively treated grades. In this embodiment, different oxidatively treated grades are useful.

Besides, the carbon black prepared surface is used to advance dispersibility.

One example of a method for the treatment of carbon black surface is controlling basic and acidity by giving coupling agent etc. having functional group which react to functional group of surface of carbon black.

The average primary particle diameter of the carbon black is preferably from 10 nm to 40 nm. This helps achieve making the deviation of resistance in the outer layer smaller for temperature in extrusion. The average primary particle diameter of carbon black can be measured by observing carbon black by electron microscope and calculating the arithmetic average diameter.

The DBP(dibutyl phthalate) oil absorption of the carbon black is preferably less than 200 cm$^3$/100 g. This helps achieve making the deviation of resistance in outer layer smaller for temperature in extrusion. It is believed to be due to improving the dispersibility of carbon black in the thermoplastic resin.

The DBP oil absorption of carbon black is an amount of DBP which 100 g of carbon black absorbs. It is measured by JIS K6221.

The pH of carbon black is preferably more than 9. This helps achieve making the deviation of resistance in the outer layer smaller for temperature in extrusion. It is believed to be due to improving the dispersibility of carbon black in the thermoplastic resin.

The pH of carbon black is measured by measuring compound liquid of carbon black and distillated water by pH meter of glass electrode.

Preparation Method

A member for an image forming apparatus as described herein can be prepared by extrusion after melting and kneading an outer layer composition comprigins the polyether ester amide, optional thermoplastic resin and optional filler.

Method for melting and kneading and method of forming are described below.

Method for Melting and Kneading

Specific examples of apparatus for melting and kneading include, but are not limited to, a biaxial kneader and a continuous monoaxial kneader etc.

Specific examples of a biaxial kneader herein include, but are not limited to, Kobe Steel Ltd. KTK type twin-screw extruder, manufactured by TOSHIBA MACHINE CO., LTD TEM type biaxial extruder, manufactured by NIHONSEIKOUSYO CO., LTD TEX type biaxial extruder, manufactured by IKEGAI CO., LTD PCM type biaxial extruder, manufactured by KURIMOTOTEKKOUSYO CO., LTD KEX type biaxial extruder.

Specific examples of a monoaxial kneader herein include, but are not limited to, manufactured by BUSS, LTD PR-46 type monoaxial kneader.

The composition, once melted and kneaded, is preferably processed to pellet by a pelletizer.

The dispersibility of conductive fillers can change by condition of dispersion. To control dispersibility of conductive fillers, it is possible to melt and knead different kinds of thermoplastic resins including conductive fillers separately, then pelletize them and mix those pellets as a whole.

Method of Extrusion

Composition melted and kneaded is formed to arbitrary shape by extrusion apparatus.

Specific examples of extrusion apparatus include, but are not limited to, circular mold.

FIG. 1 is an example for an extrusion apparatus.

An explanation of a method of extrusion is below. Pellet P is inputted and temperature of screw 2 is controlled to send thermoplastic resins to the inside of circular mold 3. A circular film is extruded from the circular mold 3 when temperature of circular mold 3 gets higher than temperature of thermoplastic resins. The circular film is cooled by mandrel 4. The circular film is pulled by pulling means 5, or an inside roller and an outside roller. After that a seamless belt is obtained.

One example of mold 3 is a spiral die which has flow passes divided in eight inside. The flow passes are joined together and become spiral. Another example of mold 3 is a coat hanger die which isn't divided and which lest compositions run round and join tighter. Then compositions flow from rips. Besides, by passing through an inner core which decides perimeter and shape, compositions are extruded and pulled by an inside roller and an outside roller.

Image Forming Apparatus and Image Forming Method

A member for an image forming apparatus is a known item and is used in publicly known apparatus.

Such image forming apparatus includes at least an image bearer, an electrostatic latent image former, an image developer, a transfer and other means as necessary.

The image forming apparatus includes the presently described member for an image forming apparatus. The member for an image forming apparatus is preferably an intermediate transfer belt and the transfer preferably includes the intermediate transfer belt.

The image forming method herein includes a step to form an electrostatic latent image, a step to form a toner image, a step to transfer the toner image, and other steps as necessary.

The image forming method uses the presently described member for an image forming apparatus. A member for an image forming apparatus is most preferably an intermediate transfer belt, and in a preferred method the step to transfer preferably includes a step using the described intermediate transfer belt.

Image Bearer

Specific examples of the material of the image bearer for use herein include, but are not limited to, amorphous silicone, selenium, polysilane, phthaloyl polyethylene etc. Among these, amorphous silicone is preferably used in point of longer operating life.

Specific examples of film formation of the image bearer of amorphous silicone for use herein include, but are not limited to, vacuum deposition method, vacuum deposition method, ion plating method, thermal chemical vapor deposition method, Photo-excited CVD method and plasma CVD etc. Among these, plasma CVD is preferably used.

Shape of the image bearer is selected for any purpose. Cylindrical shape is preferred.

The outer diameter is not limited. From 3 mm to 100 mm is preferable, from 5 mm to 50 mm is more preferable and from 10 mm to 30 mm is particularly preferable.

Electrostatic Latent Image Former and Step to Form an Electrostatic Latent Image An electrostatic latent image former is selected without limitation. For example preferably included are at least a charger to charge the surface of an image bearer and an irradiator to emit light and irradiate the surface of the charged image bearer etc.

A step to form electrostatic latent image is selected without limitation. For example preferably included are at least a charger to charge the surface of an image bearer and an irradiator to emit light and irradiate the surface of the charged image bearer etc.

Charger

Specific examples of the charger for use herein include, but are not limited to, a contact charger having conductive or semi-conductive roller, brush, film, and rubber blade etc., a non-contact charger using a corona discharge for example a corotron and a scorotron etc.

Charging is done by applying electric pressure to the surface of the image bearer using a charger.

Types of chargers are for example roller, magnet brush and fur brush etc. These chargers are elected without limitation.

In using a magnet brush as a charger, a magnet brush has a wide variety of ferrite grains for example Zn—Cu ferrite etc. and has non-magnetic conductive sleeve including magnetic roll.

In using a fur brush as a charger, furs, which are treated by metal or metal oxide for example carbon and copper sulfide, are used. And the furs are twisted or attached to metal or cored bar conductive treated.

The charger is preferably a contact charger for inhibiting ozone occurred from the charger.

Irradiator and Irradiating

Specific examples of the irradiator for use herein include, but are not limited to, copying optical system, rod lens array system, laser optic system and liquid crystal shutter glasses etc.

Specific examples of light source of the irradiator for use herein include, but are not limited to, fluorescent light, tungsten lamp, halogen lamp, mercury lamp, sodium lamp, LED, LD and electroluminescence etc.

A wide variety of filters for example sharp cut filter, bandpass filter, near-infrared cut filter, dichroic filter, interference filter and color conversion filter etc.

Irradiating is for example irradiating from the side of surface of the image bearer by the irradiator. Irradiating from the backside of surface of the image bearer is also used.

Developing Device and Step of Developing

The Developing device at least has toner to develop latent images on the image bearer.

The step of developing at least has a step to develop latent images on the image bearer by toner.

Specific examples of the developing device for use herein include, but are not limited to, dry developing system, wet developing system, homochromatic developing device and multiple color developing device.

The developing device preferably includes an agitator to charge by friction stir toners, a magnetic field generator fixed inside and a developer carrier carrying developers.

In the developing device, when toners and carriers are agitated and mixed, toners are charged by friction and kept standing on the surface of the rolling magnetic roller. Then magnetic brushes are formed. The magnetic roller is set beside the image bearer and toners making magnetic brushes on the surface of the rolling magnetic roller move on the image bearer by force of electrostatic attraction. As the result, the latent images are developed by toners and formed visible images.

Transfer Step and Transfer Unit

The transfer step is a step to transfer the visible image to a recording medium, and a preferable aspect thereof includes a primary transfer of the visible image on the intermediate transfer member using an intermediate transfer member followed by a secondary transfer of the visible image to the recording medium. An aspect which includes a primary transfer step in which a visible image is transferred using two or more colors, or preferably a full-color toner, as the toner is transferred on an intermediate transfer member to form a composite transfer image, and a secondary transfer step in which the composite transfer image is transferred on the recording medium is more preferable.

The transfer may be carried out, for example, by charging the visible image on the electrostatic latent image bearing member using a transfer charger, and it may be carried out by the transfer unit. As the transfer unit, an aspect including a primary transfer unit which forms a composite transfer image by transferring a visible image on an intermediate transfer member, and a secondary transfer unit which transfers the composite transfer image to a recording medium is preferable.

Here, the intermediate transfer member is not particularly restricted and may be appropriately selected from heretofore known transfer members according to purpose, and favorable examples thereof include a transfer belt.

The transfer unit (the primary transfer unit and the secondary transfer unit) preferably includes at least a transfer device which peels and charges the visible image formed on the electrostatic latent image bearing member to a side of the recording medium. The transfer unit may be one, or two or more.

Examples of the transfer device include a corona transfer device by corona discharge, a transfer belt, a transfer roller, a pressure transfer roller, and an adhesive transfer device.

Here, the recording medium is not particularly restricted and may be appropriately selected from heretofore known recording media (e.g., recording paper).

Fixing Step and Fixing Unit

The fixing step is a step of fixing the visible image transferred on the recording medium using a fixing unit. It may be carried out every time a toner of one color is transferred to the recording medium, or it may be carried out once toners of all the colors are laminated.

The fixing apparatus is not particularly restricted and may be appropriately selected according to purpose. Nonetheless, heretofore known heating and pressurizing units are preferable.

Examples of the heating and pressurizing units include a combination of a heat roller and a pressure roller, and a combination of a heat roller, a pressure roller and an endless belt.

The fixing apparatus preferably includes a heating member equipped with a heating element, a film in contact with the heating member, and a pressure member in pressure contact with the heating member via the film, wherein the heating and fixing is carried out by passing a recording medium on which a non-fixed image is formed between the film and the pressurizing member. Usually, heating in the heating and pressurizing member is preferably 80° C. to 200° C.

Here, herein, a heretofore known optical fixing device may be used, for example, along with or in place of the fixing step and fixing unit according to purpose.

In the fixing step, surface pressure is preferably $10N/cm^2$ to $80N/cm^2$.

Cleaning Step and Cleaning unit

The cleaning step is a step of removing the toner remaining on the electrostatic latent image bearing member, and it may be favorably carried out by a cleaning unit.

The cleaning unit is not particularly restricted as long as the electrophotographic toner remaining on the electrostatic latent image bearing member is removed, and it may be appropriately selected from heretofore known cleaners. Favorable examples thereof include a magnetic brush cleaner, an electrostatic brush cleaner, a magnetic roller cleaner, a blade cleaner, a brush cleaner, and a webcleaner.

Neutralizing Step and Neutralizing Unit

The neutralizing step is a step of neutralizing the electrostatic latent image bearing member by applying a neutralizing bias, and it may be favorably carried out by a neutralizing unit.

The neutralizing unit is not particularly restricted as long as the neutralizing bias is applied on the electrostatic latent image bearing member and may be appropriately selected from heretofore known neutralizing devices. Favorable examples thereof include a neutralizing lamp.

Recycling Step and Recycling Unit

The recycling step is a step of recycling the toner removed by the cleaning step to the developing unit, and it may be favorably carried out by a recycling unit.

The recycling unit is not particularly restricted, and examples thereof include a heretofore known conveying unit.

Controlling Step and Controlling Unit

The controlling step is a step of controlling the each step, and it may be favorably carried out by a controlling unit.

The controlling unit is not particularly restricted as long as it controls operations of the each unit, and it may be appropriately selected according to purpose. Examples thereof include devices such as sequencer and computer.

Figure 2:
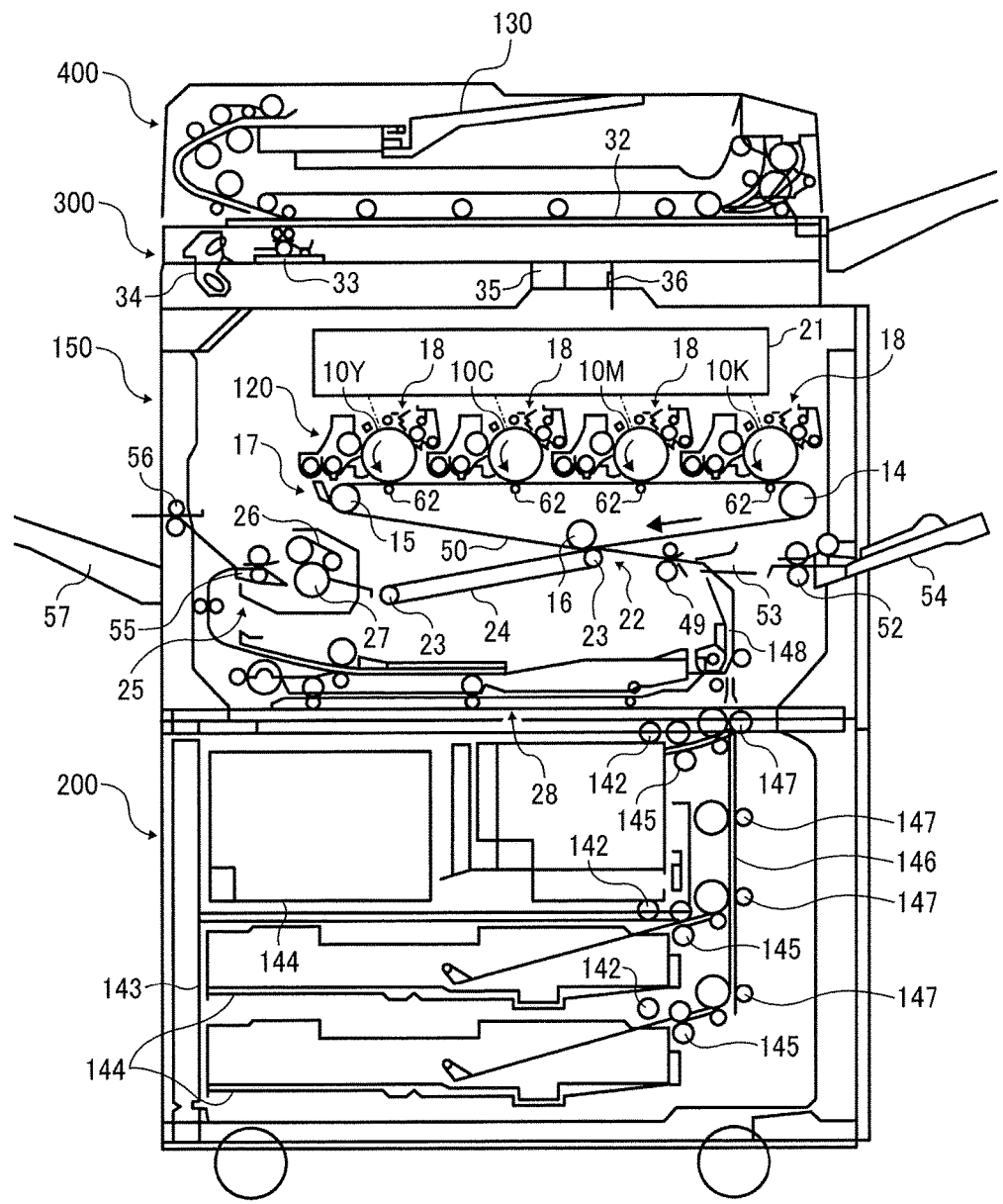
FIG. 2 is a schematic cross-sectional view illustrating an embodiment of the image forming apparatus of the present application and FIG. 3 is a partial enlargement of FIG. 2.

Another aspect of implementing the image forming method used herein by the image forming apparatus of the present application is explained in reference to FIG. 2. A tandem image forming apparatus illustrated in FIG. 2 is a tandem color image forming apparatus. This tandem image forming apparatus is equipped with a copying apparatus main body 150, a paper feed table 200, a scanner 300, and an automatic document feeder (ADF) 400.

An intermediate transfer member 50 is disposed at a central portion of the copying apparatus main body 150, and the intermediate transfer member 50 is stretched by support rollers 14, 15 and 16 and is rotatable in a clockwise direction in FIG. 2. Near the support roller 15, an intermediate transfer member cleaning apparatus 17 is disposed for removing a residual toner on the intermediate transfer member 50. A tandem developing device 120 is disposed such that four image forming units 18 of yellow, cyan, magenta and black are disposed in parallel along a conveying direction thereof facing the intermediate transfer member 50 stretched by the support roller 14 and the support roller 15. Near the tandem developing device 120, an exposure apparatus 21 is disposed. On a side of the intermediate transfer member 50 opposite from the side on which the tandem developing device 120 is disposed, a secondary transfer apparatus 22 is disposed. In the secondary transfer apparatus 22, a secondary transfer belt 24 as an endless belt is stretched by a pair of rollers 23, and a recording medium conveyed on the secondary transfer belt 24 and the intermediate transfer member 50 may be in contact with each other. Near the secondary transfer apparatus 22, a fixing apparatus 25 is disposed. The fixing apparatus 25 is equipped with a fixing belt 26 as an endless belt and a pressure roller 27 pressed by the fixing belt 26.

Here, in the tandem image forming apparatus, near the transfer apparatus 22 and the fixing apparatus 25, a sheet inverting apparatus 28 is disposed for inverting a recording medium so that an image is formed on both sides of the recording medium.

Next, a full-color image formation (color copy) using the tandem developing device 120 is explained. That is, first, a color document is set on a document table 130 of the automatic document feeder (ADF) 400. Alternatively, the automatic document feeder 400 is opened, the document is set on a contact glass 32 of the scanner 300, and the automatic document feeder 400 is closed.

A start button (not shown) is pressed. The scanner 300 activates after the document is conveyed and transferred to the contact glass 32 in the case the document has been set on the automatic document feeder 400, or right away in the case the document has been set on the contact glass 32, and a first travelling body 33 equipped with a light source and a second travelling body 34 equipped with a mirror travel. At this time, a light irradiated from the first travelling body 33 is reflected from a surface of the document, and the reflected light is reflected by the second travelling body 34, which is received by a reading sensor 36 through an imaging lens 35. The color document (color image) is read thereby, and black, yellow, magenta and cyan image information may be obtained.

Then, the black, yellow, magenta, and cyan image information are transmitted to respective image forming unit 18 (a black image forming unit, a yellow image forming unit, a magenta image forming unit, and a cyan image forming unit) in the tandem developing device 120, and in the respective image forming units, black, yellow, magenta, and cyan toner images of are respectively formed.

Figure 3:
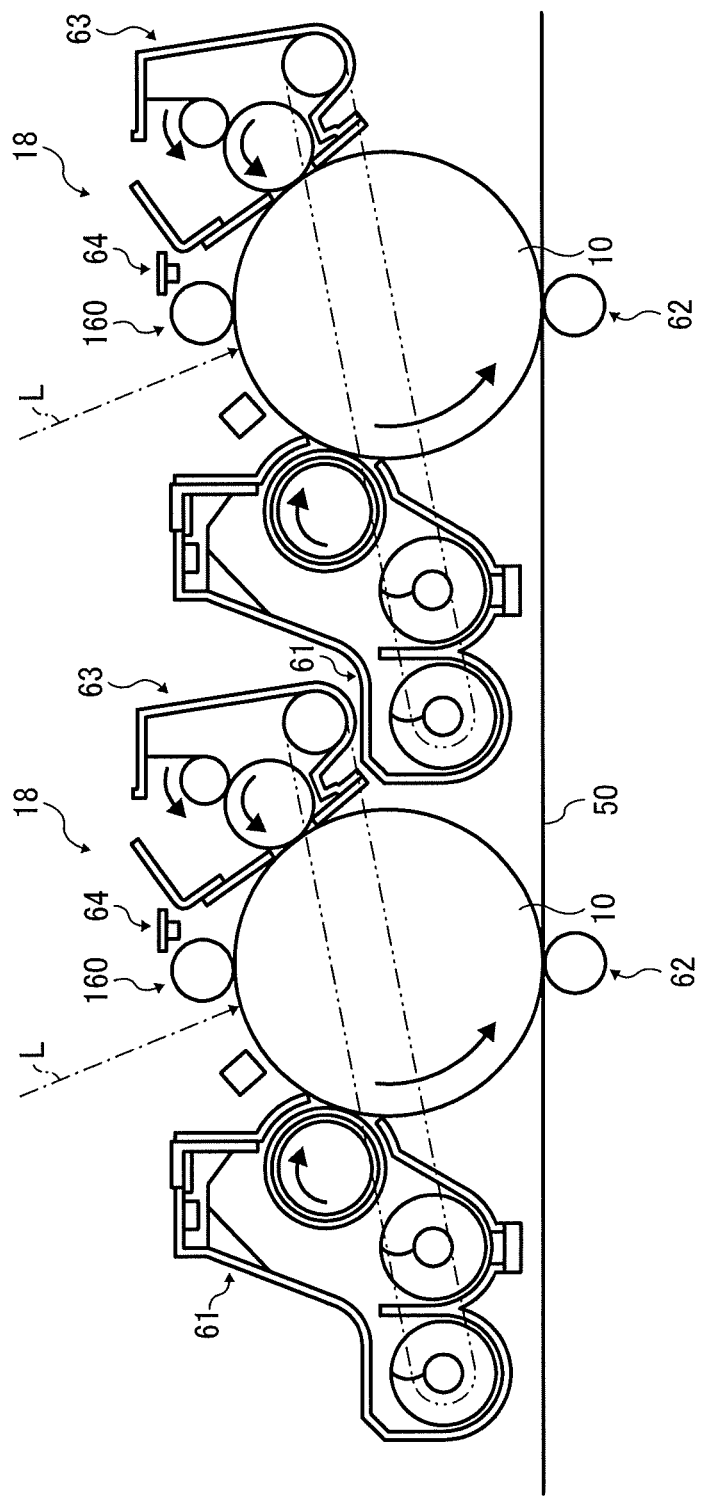

That is, each of the image forming units 18 is equipped with, as illustrated in FIG. 3; an electrostatic latent image bearing member 10; a charging apparatus 160 which uniformly charges the electrostatic latent image bearing member 10; an exposure apparatus which exposes the electrostatic latent image bearing member (L in FIG. 3) in an imagewise manner of each color image based on each color image information to form an electrostatic latent image corresponding to each color image on the electrostatic latent image bearing member; a developing apparatus 61 which develops the electrostatic latent image using each color toner (a black toner, a yellow toner, a magenta toner, and a cyan toner) to form a toner image of the respective color toner; a transfer charger 62 for transferring the toner image to the intermediate transfer member 50; a cleaning apparatus 63; and a neutralizing device 64, and an image of a single color (a black image, a yellow image, a magenta image, and a cyan image) may be formed based on the image information.

Regarding the black image, the yellow image, the magenta image and the cyan image thus formed, the black image formed on the black electrostatic latent image bearing member 10K, the yellow image formed on the yellow electrostatic latent image bearing member 10Y, the magenta image formed on the magenta electrostatic latent image bearing member 10M, and the cyan image formed on the cyan electrostatic latent image bearing member 10C are sequentially transferred on the intermediate transfer member 50 rotationally moved by support rollers 14, 15 and 16 (primary transfer) as illustrated in FIG. 2. Then, a composite color image (color transfer image) is formed by superimposing the black image, the yellow image, the magenta image, and the cyan image on the intermediate transfer member 50.

Meanwhile, in the paper feed table 200, one of paper feed rollers 142 is selectively rotated to feed a sheet (recording paper), from one of the paper feed cassettes 144 equipped in multiple stages in a paper bank 143. The recording paper is separated one by one by a separation roller 145 and sent to a sheet feed path 146. Each recording paper is conveyed by a conveying roller 147 and guided to a sheet feed path 148, and it stops by striking a resist roller 49. Alternatively, the paper feed roller 142 is rotated to feed a sheet (recording paper) on a manual feed tray 54. The recording paper is separated one by one by a separation roller 145 and guided to a manual sheet feeding path 153, and it stops by striking the resist roller 49. Here, the resist roller 49 generally used while grounded, but it may also be used in a state that a bias is applied for removing paper dust on the sheet. Thereafter, by rotating the resist roller 49 in accordance with the timing of the composite color image (color transfer image) formed on the intermediate transfer member 50, the sheet (recording paper) is fed between the intermediate transfer member 50 and a secondary transfer apparatus 22. By transferring the composite color image (color transfer image) on the sheet (recording paper) by the secondary transfer apparatus 22 (secondary transfer), a color image is transferred to and formed on the sheet (recording paper). Here, a residual toner on the intermediate transfer member 50 after the image transfer is cleaned by an intermediate transfer member cleaning apparatus 17.

The sheet (recording paper) on which the color image is transfer and formed is conveyed by the secondary transfer apparatus 22 and fed to a fixing apparatus 25, and in the fixing apparatus 25, the composite color image (color transfer image) is fixed on the sheet (recording paper) by heat and pressure. Thereafter, the sheet (recording paper) is switched by a switching claw 55 and discharged by a discharge roller 56, stacked on a discharge tray 57. Alternatively, the sheet (recording paper) is switched by the switching claw 55, inverted by the sheet inverting apparatus 28 and guided again to a transfer position. After an image is formed similarly on a rear surface as well, the sheet (recording paper) is discharged by the discharge roller 56 and stacked on the discharge tray 57.

EXAMPLES

The following examples illustrate what is described herein, but is not limiting.

Example 1-19

Comparative Examples 1-7

In the manner prescribed Table 1, thermoplastic resins, polyether ester amides, and conductive fillers were inputted and mixed in henschel mixer SMP manufactured by KAWATA CO., LTD, and powder was prepared. The powders were melted and kneaded, and processed to a pellet by TEM type biaxial extruder manufactured by TOSHIBA MACHINE CO., LTD. Besides, the pellet was melted and kneaded twice to process a two-passed pellet.

By a circular mold for melting and kneading extrusion, a two-passed pellet was extruded, and a seamless belt having perimeter 960 mm and thickness 100 µm was processed. The thickness of the seamless belt could be changed optionally by the shape of the circular mold and processing conditions. The thickness of the seamless belt was controlled anywhere from 60 µm to 150 µm in concert with size of a printer.

The seamless belt was washed under the action of ultrasonic waves using the below conditions. The seamless belt was dipped in a 2 L measuring cylinder filled by cleaning liquid. The ultrasonic wave was applied at 50° C. in a constant temperature tank controlling temperature and a device generating the ultrasonic wave. 10-point average intensity of the ultrasonic wave in 10 sec later from measure starting was set in range 8 to 12 psi at center of a constant temperature water tank and at 5 cm depth from a generator of the ultrasonic wave. Then the seamless belt was removed and extra water was dried by compressed air. Then the seamless belt was dried by a constant temperature tank for six hours.

Cleaning condition 1: 24 hours ultrasonic wave cleaning in aqueous solution including an amount of 50% acetone by weight.

Cleaning condition 2: 12 hours ultrasonic wave cleaning in aqueous solution including an amount of 50% acetone by weight.

Cleaning condition 3: 6 hours ultrasonic wave cleaning in aqueous solution including an amount of 50% acetone by weight.

Cleaning condition 4: 3 hours ultrasonic wave cleaning in aqueous solution including an amount of 50% acetone by weight.

Cleaning condition 5: 1 hours ultrasonic wave cleaning in aqueous solution including an amount of 50% acetone by weight.

Cleaning condition 6: 30 minutes ultrasonic wave cleaning in aqueous solution including an amount of 50% acetone by weight.

Cleaning condition 7: 10 minutes ultrasonic wave cleaning in aqueous solution including an amount of 50% acetone by weight.

Cleaning condition 8: 24 hours ultrasonic wave cleaning in aqua pure.

In example 10, instead of cleaning the seamless belt by the ultrasonic wave and drying, the pellet of polyether ester amides before melting and kneading was cleaned on above cleaning condition 2 and dried for 24 hours in a constant temperature tank at 80° C.

In comparative example 3, the seamless belt was cleaned three times on above cleaning condition 3.

In comparative example 4-7, the seamless belt was not cleaned.

Next, property of the seamless belt was measured.
Amount of Polyethylene Glycol

A 5 g sample of the seamless belt was cut in 10 mm width and placed in 30 g aqua pura heated at 50° C. in sealed glass case and exposed to ultrasonic wave for 40 minutes. Then it was left to stand at 45° C. for more than 12 hours and the sample was filtered by a membrane filter having pore sizes of 5 m. Then the filter body was dried for 12 hours in a constant temperature tank at 120° C. until water vanished and weight $B_0$ of a residual material was weighed.

After weighting, a weight B of the residual material, p-dichlorobenzene was added as standard substance and it was measured by $^1$HNMR in deuterated solvent DMSO. Then an amount of polyethylene glycol A[μmol] present was calculated from a ratio of a signal of polyethylene glycol to a signal of the standard substance. The amount of polyethylene glycol A[μmol/g] was calculated by formula A×B$_0$/B/5.

When using a member for an image forming apparatus including a laminate structure made of different materials, after cutting off a measure of an outer layer as above, an amount of polyethylene glycol in the outer layer can be determined by the above method.

Amount of Polyether Ester Amide

An amount of polyether ester amide was calculated from a formula.

In case using unknown material, the amount of polyether ester amide was calculated by combination of analysis methods, because different methods were used depending on material.

The amount of polyether ester amide was calculated by combination of analysis methods for example Gas Chromatography Mass Spectrometer (GC-MS), Liquid Chromatograph Mass Spectrometer (LC-MS), Thermogravimetry-Differential Thermal Analysis (TG/DTA), Differential Scanning calorimetry (DSC), Atomic Emission Detector (AED), Inductively Coupled Plasma Atomic Emission Spectrometry (ICP-OES/ICP-AES) and Fourier-transform infrared spectroscopy (FT-IR) etc., and extractive analyses.

Solvents of polyamide type for example fluoric alcohol, hydrogen halide, hexamethylphosphoramide, tetramethylurea and concentrated sulfuric acid were used. Because polypropylene dissolves in aromatic hydroxylase, for example benzene and toluene etc., and hydrogen chloride, for example carbon tetrachloride etc. and polyvinylidene difluoride dissolves in DMF and DMA, polyvinylidene difluoride was extracted by using difference of solubility. The amount of polyether ester amide was measured from extracted residue or extraction liquid by using GC-MS.

Table 1 describes the components and properties of seamless belts.

TABLE 1

|  | thermoplastic resins | | fillers | | PEEA | | cleaning conditions | amount of PEG in layer (μmol/g) | Tc1-Tc2 [° C.] |
|---|---|---|---|---|---|---|---|---|---|
|  | kind | amount [weight %] | kind | amount [weight %] | kind | amount [weight %] | | | |
| EX 1 | PP | 85.5 | ABk | 7.5 | MH1657 | 7.0 | 1 | 1.2 | 27 |
| EX 2 | PP | 85.5 | ABk | 7.5 | MH1657 | 7.0 | 2 | 3.2 | 27 |
| EX 3 | PP | 85.5 | ABk | 7.5 | MH1657 | 7.0 | 3 | 7.9 | 27 |
| EX 4 | PP | 85.5 | ABk | 7.5 | MH1657 | 7.0 | 4 | 9.9 | 27 |
| EX 5 | PP | 85.5 | KBk | 7.5 | MH1657 | 7.0 | 5 | 12.8 | 27 |
| EX 6 | PP | 85.5 | ABk | 7.5 | MH1657 | 7.0 | 6 | 14.7 | 27 |
| EX 7 | PP | 85.5 | ABk | 7.5 | MH1657 | 7.0 | 7 | 16.6 | 27 |
| EX 8 | PP | 93.0 | — | 0.0 | MH1657 | 7.0 | 8 | 20.8 | 27 |
| EX 9 | PP | 85.5 | ABk | 7.5 | MH1657 | 7.0 | 8 | 20.7 | 27 |
| EX 10 | PP | 85.5 | ABk | 7.5 | MH1657 | 7.0 | — | 4.1 | 27 |
| EX 11 | PP | 85.5 | ABk | 7.5 | AS | 7.0 | 2 | 3.5 | 23 |
| EX 12 | PP | 85.5 | ABk | 7.5 | P22 | 7.0 | 3 | 3.2 | 59 |
| EX 13 | PVDF | 85.5 | ABk | 7.5 | MH1657 | 7.0 | 8 | 2.6 | 5 |
| EX 14 | PVDF | 85.5 | KBk | 7.5 | P22 | 7.0 | 3 | 11.7 | 37 |
| EX 15 | PP | 91.5 | ABk | 7.5 | MH1657 | 1.0 | 3 | 1.1 | 27 |
| EX 16 | PP | 77.5 | ABk | 7.5 | MH1657 | 15.0 | 3 | 10.2 | 27 |
| EX 17 | PP | 77.5 | ZnO | 7.5 | MH1657 | 15.0 | 2 | 4.1 | 27 |
| EX 18 | PVDF | 85.5 | ABk | 7.5 | AS | 7.0 | 2 | 2.5 | 1 |
| EX 19 | PVDF | 85.5 | ABk | 7.5 | U3 | 7.0 | 2 | 1.1 | 56 |
| COM 1 | PP | 92.5 | ABk | 7.5 | MH1657 | 0.0 | 3 | 0.0 | 27 |
| COM 2 | PP | 75.5 | ABk | 7.5 | MH1657 | 17.0 | 3 | 16.7 | 27 |
| COM 3 | PP | 85.5 | ABk | 7.5 | MH1657 | 7.0 | — | 0.0 | 27 |
| COM 4 | PP | 85.5 | ABk | 7.5 | MH1657 | 7.0 | — | 28.7 | 27 |
| COM 5 | PVDF | 85.5 | ABk | 7.5 | MH1657 | 7.0 | — | 26.4 | 5 |
| COM 6 | PVDF | 85.5 | KBk | 7.5 | AS | 7.0 | — | 28.5 | 1 |
| COM 7 | PP | 85.5 | ABk | 7.5 | PVH | 7.0 | — | 35.5 | −29 |

Symbols in Table 1 are explained below.
Thermoplastic Resins
  PP: melting point 169° C., crystallization temperature (Tc2) 113° C. polypropylene, NOVATEC manufactured by JAPAN POLYPROPYLENE CO, LTD.
  PVDF: melting point 168° C., crystallization temperature (Tc2) 135° C. polyvinylidene fluoride, Kynar720 manufactured by ARKEMA CO, LTD.
PEEA (Polyether Ester Amide)
  MH1657: melting point 204° C., crystallization temperature (Tel) 140° C. PEBAX MH1657 having units coming from PEG, manufactured by ARKEMA CO, LTD.
  AS: melting point 196° C., crystallization temperature (Tel) 136° C. PELECTRON AS having units coming from PEG manufactured by SANYO CHEMICAL INDUSTRIES CO, LTD.
  P22: melting point 216° C., crystallization temperature (Tel) 172° C. Irgastat P22 having units coming from PEG manufactured by BASF CO, LTD.
  PVH: melting point 139° C., crystallization temperature (Tel) 84° C. PELECTRON PVH having units coming from PEG manufactured by SANYO CHEMICAL INDUSTRIES CO, LTD.
  U3: melting point 220° C., crystallization temperature (Tel) 191° C. IPE U3 having units coming from PEG manufactured by IONPHASE CO, LTD.
Conductive Fillers
  ABk: granular acetylene black DENKA BLACK manufactured by DENKA CO, LTD.
  KBk: KETJENBLACK EC300J manufactured by LION CO, LTD.

ZnO: zinc oxide fillers PANATETRA WZ-0501 manufactured by PANASONIC CO, LTD.

Melting Point, Crystallization Temperature

Melting point and Crystallization temperature were measured by DSC in below conditions. Maximum endothermic peak temperature was considered as melting point at heating up. And maximum exothermic peak was considered as crystallization temperature at dropping temperature.

—Measurement Device—
DSC: Q2000 manufactured by TA INSTRUMENTS CO, LTD.

—Measurement Conditions—
Sample case: Aluminum sample pan (with cover)
Amount of samples: 5 mg
Reference: Aluminum sample pan
Atmosphere: $N_2$ (flow ratio 50 ml/min)
Onset temperature: −20° C.
Heating up speed: 10° C./min
End temperature: 230° C.
Holding time: 1 min
Dropping temperature rate: 10° C./min
End temperature: −50° C.

Next, deviation of resistance of the seamless belt, resistance property of filmings, self-extinguishing and image durability at high-temperature and humid condition were valued.

Deviation of Resistance

The surface resistivity [Ω/□] of the seamless belt was measured 32 points in a circumferential direction at 30 mm intervals at 23° C., 55% RH by Hiresta-URS probes manufactured by MITSUBISHI CHEMICAL ANALYTECH CO, LTD. Next, common logarithm of the surface resistivity [Ω/□] of the seamless belt, what is termed P-P [Peak to Peak] [Log(Ω/□)], was calculated as the deviation of resistance and judged by below rule.

Rule
A≤0.5
0.5<B≤1.0
1.0<C≤1.5
1.5<D≤2.0
2.0<E

If the deviation of resistance of the seamless belt was beyond 2 [Log(Ω/□)], first transfer or second transfer was poorly on high surface resistivity area and it resulted abnormal images.

Resistance Property of Filming

The seamless belt was installed as an intermediate transfer belt in a printer MP C2503 manufactured by RICOH CO, LTD. And an endurance test to print on PPC paper High White A4 was held. In detail, An image chart having printing ratio 0.5% each color was printed 1000 copies in the direction of A4 side at 25±3° C., 50±10% RH.

Gloss level of the seamless belt was measured before and after the endurance test at entry angle 60° by Gloss Meter PG-IIM manufactured by NIPPON DENSHOKU INDUSTRIES CO, LTD. The gloss level is average of 5 points measurement. Next, maintenance ratio of gloss level [%] was calculated by below formula and judged below rule.

(Gloss level after the endurance test)/(Gloss level before the endurance test)×100

Rule
80<A
60<B≤80
40<C≤60
20<D≤40
E≤20

If the maintenance ratio of gloss level [%] was less than 20%, filmings occurred on seamless belt as intermediate transfer belt and it resulted abnormal images.

Self-Extinguishing

The flame resistant properties of the seamless belt was valued according to UL standard. In detail, samples keeping at right angle were touched flame of a gas burner for ten seconds. If burning stopped in 30 seconds, the samples were touched flame for more 10 seconds.

Grades of vertical burning test (V-2, V-1, V-0, 5V) have self-extinguishing.

Image Durability at High-temperature and Humid Condition

The seamless belt was cut 40 mm×130 mm, and it was bolted around the image bearer of the printer MP C2503 manufactured by RICOH CO, LTD. The image bearer bolted by the strip seamless belt was kept for 14 days at 45° C., 95% RH and was ejected. The strip seamless belt was removed from the image bearer and the image bearer was installed in the printer MP C2503 manufactured by RICOH CO, LTD. Halftone image of magenta was printed and area ratio (%) of abnormal image with a void in the area bolted the seamless belt was calculated. Then it was valued.

Rule
A≤2
2>B≥5
5>C≥50
D>50

Table 2 shows deviation of resistance of the seamless belt, resistance property of filmings, self-extinguishing and image durability at high-temperature and humid condition.

TABLE 2

| | deviation of resistance | | resistance property of filming | | self-extinguishing | image durability at high-temperature and humid condition |
|---|---|---|---|---|---|---|
| | P-P | judge | maintenance ratio of gloss level [%] | judge | | |
| EX 1 | 1.21 | C | 70.2 | B | — | B |
| EX 2 | 1.11 | C | 74.3 | B | — | B |
| EX 3 | 1.32 | C | 68.2 | B | — | B |
| EX 4 | 1.28 | C | 52.1 | C | — | B |
| EX 5 | 1.11 | C | 48.5 | C | — | B |
| EX 6 | 1.32 | C | 55.2 | C | — | B |
| EX 7 | 1.35 | C | 35.2 | D | — | B |
| EX 8 | 1.43 | C | 33.1 | D | — | B |
| EX 9 | 1.18 | C | 38.2 | D | — | B |
| EX 10 | 2.32 | D | 72.1 | B | — | B |
| EX 11 | 2.21 | D | 77.2 | B | — | B |
| EX 12 | 0.87 | B | 63.2 | B | — | A |
| EX 13 | 0.79 | B | 85.2 | A | V-0 | B |
| EX 14 | 0.42 | A | 78.2 | B | V-0 | A |
| EX 15 | 1.45 | C | 55.6 | C | — | B |
| EX 16 | 1.44 | C | 51.3 | C | — | B |
| EX 17 | 2.12 | D | 54.3 | C | — | B |
| EX 18 | 0.77 | B | 82.2 | A | V-0 | C |
| EX 19 | 0.23 | A | 88.5 | A | V-0 | A |
| COM 1 | 2.65 | E | 46.2 | C | — | B |
| COM 2 | 2.82 | E | 52.1 | D | — | B |
| COM 3 | 2.93 | E | 18.2 | E | — | B |
| COM 4 | 1.78 | C | 17.5 | E | — | B |
| COM 5 | 1.86 | C | 18.2 | E | V-0 | B |
| COM 6 | 1.68 | C | 17.8 | E | V-0 | C |
| COM 7 | — | E | 15.8 | E | — | D |

Table 2 shows the seamless belts of example 1 to 19 had minor deviation of resistance and high resistance property of filming.

Because the seamless belt of comparative example 1 didn't include PEEA, deviation of resistance was large.

Because the seamless belt of comparative example 2 had 17.0 weight % of PEEA, deviation of resistance was large.

Because the seamless belt of comparative example 3 didn't include PEG, deviation of resistance was large and resistance property of filming was low.

Because the seamless belt of comparative example 4 to 6 had 26.4 µmol/g to 28.7 µmol/g of PEG, resistance property of filming was low.

Because the seamless belt of comparative example 7 had 35.5 µmol/g of PEG, resistance property of filming was low.

As used herein, the outer layer of a single layered member for an image forming apparatus (e.g., a single-layered endless belt—see the Examples above) is the entire layer. For a multi-layered member for an image forming apparatus, for example a laminated member, the outer layer is the layer on the side of the member that contacts toner or recording media (e.g., paper sheets). See for example element 50 in FIG. 2.

As used herein the words "a" and "an" and the like carry the meaning of "one or more."

The above written description provides a manner and process of making and using the embodiments described such that any person skilled in this art is enabled to make and use the same, this enablement being provided in particular for the subject matter of the appended claims, which make up a part of the original description.

What is claimed is:

1. A member for an image forming apparatus comprising an outer layer, wherein the outer layer comprises:
   1-15 weight % of a polyether ester amide having a structural unit of polyethylene glycol therein, and
   1 µmol/g to 25 µmol/g of polyethylene glycol,
   each based on the total weight of the outer layer,
   said outer layer further comprising:
   a thermoplastic resin, and
   a conductive filler.

2. The member for an image forming apparatus of claim 1, wherein the outer layer comprises 1 µmol/g to 15 µmol/g of the polyethylene glycol.

3. The member for an image forming apparatus of claim 1, wherein the outer layer comprises 1 µmol/g to 8 µmol/g of the polyethylene glycol.

4. The member for an image forming apparatus of claim 1, wherein the polyether ester amide has a melting point of 200° C. to 230° C.

5. The member for an image forming apparatus of claim 1, wherein the polyether ester amide has a melting point of 210° C. to 230° C.

6. The member for an image forming apparatus of claim 1, wherein:
   the polyether ester amide is a crystalline resin, the thermoplastic resin is a crystalline resin, and wherein:

$$100 \geq Tc1 - Tc2 \geq 5,$$

where Tc1[° C.] is the crystallization temperature of the polyether ester amide and Tc2[° C.] is the crystallization temperature of the thermoplastic resin.

7. The member for an image forming apparatus of claim 6, wherein $$100 \geq Tc1 - Tc2 \geq 35.$$

8. The member for an image forming apparatus of claim 1, wherein the conductive filler is a carbon black.

9. The member for an image forming apparatus of claim 1, wherein the thermoplastic resin is a polyvinylidene fluoride.

10. The member for an image forming apparatus of claim 1, wherein the member for an image forming apparatus is an intermediate transfer roller.

11. The member for an image forming apparatus of claim 1, wherein the member for an image forming apparatus is an intermediate transfer belt or a second transfer belt.

12. The member for an image forming apparatus of claim 1, wherein the member for an image forming apparatus is a second transfer belt.

13. The member for an image forming apparatus of claim 1, wherein the member for an image forming apparatus is a paper conveyance belt.

14. A method of producing the member for an image forming apparatus of claim 1, comprising melting and kneading a composition comprising the polyether ester amide, the thermoplastic resin and the conductive filler, and extruding the melted and kneaded composition.

15. An image forming apparatus, comprising:
   an image bearer;
   an electrostatic latent image former to form an electrostatic latent image on the image bearer; and
   a transferer to transfer a visible image onto a recording medium,
   wherein the image forming apparatus further comprises the member for an image forming apparatus of claim 1.

16. The member for an image forming apparatus of claim 1, wherein the member for an image forming apparatus is a single-layered endless belt.

17. The member for an image forming apparatus of claim 1, wherein the member for an image forming apparatus is a multi-layered member.

* * * * *